(12) United States Patent
Thoumazet et al.

(10) Patent No.: US 8,822,018 B2
(45) Date of Patent: Sep. 2, 2014

(54) HYDROPHOBIC SUBSTRATE INCLUDING A PLASMA-ACTIVATED SILICON OXYCARBIDE PRIMER

(75) Inventors: Claire Thoumazet, Paris (FR); Bernard Nghiem, Arsy (FR); Bruno Cordier, Quincy-Voisins (FR)

(73) Assignee: Saint-Gobain Glass France, Courbevoie (FR)

( * ) Notice: Subject to any disclaimer, the term of this patent is extended or adjusted under 35 U.S.C. 154(b) by 337 days.

(21) Appl. No.: 13/143,243

(22) PCT Filed: Jan. 6, 2010

(86) PCT No.: PCT/FR2010/050012
§ 371 (c)(1),
(2), (4) Date: Aug. 29, 2011

(87) PCT Pub. No.: WO2010/079299
PCT Pub. Date: Jul. 15, 2010

(65) Prior Publication Data
US 2011/0305874 A1    Dec. 15, 2011

(30) Foreign Application Priority Data
Jan. 9, 2009    (FR) ..................................... 09 50098

(51) Int. Cl.
*B32B 7/02*    (2006.01)
(52) U.S. Cl.
USPC ........... 428/212; 428/172; 428/220; 427/535; 427/539
(58) Field of Classification Search
USPC ................... 428/172, 212, 220; 427/535, 539
See application file for complete search history.

(56) References Cited

U.S. PATENT DOCUMENTS

2007/0141114 A1*    6/2007    Muisener et al. ............. 424/427
2008/0038483 A1     2/2008    Goetz et al.
2008/0241523 A1    10/2008    Huignard et al.

FOREIGN PATENT DOCUMENTS

FR    2 866 643    8/2005

OTHER PUBLICATIONS

International Search Report Issued Apr. 29, 2010 in PCT/FR10/050012 filed Jan. 6, 2010.

* cited by examiner

*Primary Examiner* — Aaron Austin
*Assistant Examiner* — Lawrence Ferguson
(74) *Attorney, Agent, or Firm* — Oblon, Spivak, McClelland, Maier & Neustadt, L.L.P.

(57) ABSTRACT

The invention relates to a process for obtaining a hydrophobic coating on a substrate, preferably consisting of a glass material, a ceramic or a glass-ceramic, said process being characterized in that it comprises:
   a) a first deposition step, consisting in applying a primer first layer essentially consisting of the silicon oxycarbide $SiO_xC_y$ type on said substrate, said primer layer having an RMS surface roughness of greater than 4 nm;
   b) an activation step, in which said $SiO_xC_y$ primer layer is activated by a plasma of a gas chosen from the noble gases of the Ar or He type and the gases $N_2$, $O_2$ or $H_2O$ or by a plasma of a mixture of these gases; and
   c) a second deposition step, in which a hydrophobic coating comprising at least one fluorocompound, preferably a fluoroalkylsilane, is deposited on said first layer.

The invention also relates to hydrophobic glazing comprising or formed by a substrate as defined above, this glazing being in particular used as glazing for transport vehicles or for buildings.

20 Claims, No Drawings

HYDROPHOBIC SUBSTRATE INCLUDING A PLASMA-ACTIVATED SILICON OXYCARBIDE PRIMER

The present invention relates to the hydrophobic treatment of a substrate, especially one consisting of a glass material, a ceramic, a glass-ceramic, etc.

The substrates according to the invention are preferably glass glazing panels. They are used in particular in the aeronautical, railway or automotive fields. They may also be used in the building field or in the interior design field, for example decorative panels, for furniture, for domestic electrical equipment (refrigerator doors, oven doors, display cases), etc.

As is known, the aim of this type of treatment is to give the substrate a nonwetting, or rain-resistant, character.

The term "wetability" denotes the property whereby polar or non polar liquids adhere to the substrate, forming an undesirable film, and also the tendency of a substrate to retain dust or dirt of all kinds, fingerprints, insects, etc.

The presence of water, often laden with dirt, is problematic in particular for a transparent substrate of the glazing type, especially one used in the transport field. The nonwetting property of a substrate, usually called hydrophobicity, is greater the higher the contact angle between a hydrophilic liquid and this substrate, for example at least 90° in the case of water. The liquid then tends to easily flow off the substrate in the form of droplets, simply by gravity if the substrate is inclined, or under the effect of aerodynamic forces in the case of a moving vehicle.

The benefit of incorporating a hydrophobic coating of the invention on a substrate, especially a glass substrate, for this type of product is twofold. Firstly, it allows the water droplets to flow off vertical or inclined surfaces, especially under the effect of aerodynamic forces, for example in the case of a moving vehicle. Secondly, these droplets, flowing off the substrate, incorporate dirt and carry this away. The visibility through the glazing is improved to such a degree that it is possible to dispense in certain cases with cleaning devices (windshield washer fluids, windshield wipers).

Agents known for imparting this hydrophobic property that can be used in the form of a coating layer on glazing (substrate) are for example fluoroalkylsilanes such as those described in patent applications EP 0 492 417, EP 0 492 545 and EP 0 672 779 or WO 2007/012779. According to these documents, this layer may be obtained by applying a solution containing fluoroorganosilanes in an aqueous or nonaqueous solvent to the surface of a substrate.

Commonly used hydrophobic agents are, for example, alkylsilanes, the alkyl group of which has at least one perfluorenated end group, i.e. one consisting of an $F_3C—(CF_2)_n$- group, in which n is a positive integer or zero.

One of the problems arising with the greatest acuity in the field of the invention is firstly that of the abrasion of the hydrophobic coating. This abrasion occurs to a greater or lesser extent during substrate cleaning operations, which are periodically necessary, in particular for restoring satisfactory vision through a transparent substrate. Thus, it has long been sought to minimize the gradual removal of the hydrophobic coatings of the aforementioned types, this occurring in particular under the action of windshield wipers in the case of an automobile windshield. Such removal may moreover and additionally result from degradation by ultraviolet radiation.

For example, it is known from the aforementioned patent application EP 0 492 545 A2 to increase the adhesion of the hydrophobic coating by subjecting the substrate to a priming treatment before the coating is applied. This treatment consists in forming a thin intermediate layer using what are called priming agents or primers, which usually are silicon compounds having at least two hydrolysable functional groups. As is well known, one hydrolysable functional group allows chemical bonding to the substrate by an oxygen atom linked to the silicon atom, a second hydrolysable functional group enabling the hydrophobic agent to be attached. Thus, to obtain a silica ($SiO_2$) primer layer, known priming agent precursors are most often used. As priming agents, patent application EP 0 492 545 A2 mentions in particular the compounds $SiCl_4$, $SiHCl_3$, $SiH_2Cl_2$ and $Cl(SiCl_2O)_nSiCl_3$, n being an integer between 1 and 4.

However, although such sublayers do make it possible to obtain performance levels complying with the great majority of UV specifications, they still remain insufficient in terms of mechanical strength and more particularly abrasion resistance, especially according to the standards currently imposed by automobile manufacturers. Furthermore, in general they do not have sufficient chemical inertness enabling them typically to meet hydrolytic resistance requirements, especially for the purpose of outdoor use.

In particular, the trials carried out by the Applicant have demonstrated that in most cases such coatings cannot easily meet the specifications imposed by automobile manufacturers, and measured for example by the Opel® or Toyota® tests in the case of abrasion resistance and by the NSF (neutral salt fog) resistance test according to the standard NF ISO 9227 in the case of hydrolytic resistance.

For example, the coatings described in patent applications EP 944 687 and EP 1 102 825, the UV resistance and mechanical strength performance of which appears to be satisfactory, have only moderate salt corrosion resistance, as measured by the NSF test. This insufficiency could limit the development of said coatings, in particular in the Asian market where the standards are the strictest in this field.

To further improve the mechanical strength properties of a hydrophobic coating, it has already been proposed, in patent application WO 2005/084943, to activate an $SiO_2$ primer layer by a fluorine-containing reactive plasma, for example a plasma based on $SF_6$ or $C_2F_6$, optionally mixed with oxygen, under conditions enabling the $SiO_2$ layer to be etched. In this application, it is particularly stated that such etching substantially improves the abrasion resistance of the hydrophobic substrate obtained after deposition of perfluoro-terminated alkylsilane, without its hydrolytic performance deteriorating.

Thus, the main subjects of the present invention are substrates coated with a hydrophobic coating and the process for obtaining them, the properties of which are improved. More particularly, the hydrophobic substrates according to the invention are provided with coatings having improved abrasion resistance performance never yet observed in relation to the performance of coatings known at the present time. Furthermore, according to another aspect of the present invention, the hydrophobic substrates according to the invention have a particularly high hydrolytic resistance.

Such performance typically makes it possible for the substrates to meet the specifications imposed at the present time by the automotive or aeronautical industry more effectively, both in terms of abrasion resistance, UV resistance and salt corrosion resistance.

For this purpose, according to a first aspect, one subject of the invention is a process for obtaining a hydrophobic coating on a substrate, preferably consisting of a glass material, a ceramic or a glass-ceramic, said process being characterized in that it comprises:

a) a first deposition step, consisting in applying a primer first layer of the silicon oxycarbide $SiO_xC_y$ type (often simplified to the form SiOC in this description), i.e.

essentially or exclusively consisting of $SiO_xC_y$, on said substrate, said primer layer having an RMS surface roughness of greater than 4 nm;

b) an activation step, in which said $SiO_xC_y$ primer layer is activated by a plasma of a gas chosen from the noble gases of the Ar or He type and the gases $N_2$, $O_2$ or $H_2O$ or by a plasma of a mixture of at least two of these gases, preferably under conditions that do not modify its surface roughness or not substantially so; and c) a second deposition step, in which a hydrophobic coating typically comprising at least one fluorocompound, preferably a fluoroalkylsilane, is deposited on said first layer.

According to a preferred method of implementing the invention, the step of activating said $SiO_xC_y$ primer layer is carried out by means of a plasma of a gas mixture containing $H_2O$ and at least one gas chosen from Ar, He and $N_2$, the volume percentage of $H_2O$ in the mixture preferably being less than or equal to about 3%.

Typically, the $SiO_xC_y$ primer layer is deposited by thermal CVD (chemical vapor deposition) under conditions enabling an RMS surface roughness of between and 15 nm, especially between 6 and 15 nm, to be obtained.

According to one possible method of implementation, the step of depositing the hydrophobic coating is carried out using a solution obtained from a perfluoroalkylsilane of formula:

$$F_3C-(CF_2)_m-(CH_2)_n-Si(X)_{3-p}(R)_p$$

in which:
- m=0 to 15, preferably 5 to 9;
- n=1 to 5, preferably n=2;
- p=0, 1 or 2, preferably 0 or 1, very preferably 0;
- R is an alkyl group or a hydrogen atom; and
- X is a hydrolysable group, such as a halide group or an alkoxy group.

According to another method of implementation, the step of depositing the hydrophobic coating is carried out using a solution obtained from a perfluoroalkylsilane of the perfluoropolyethersilane type.

Certain preferred embodiments of the invention are described below in greater detail with reference to the three main steps of the process described above:

1) CVD Deposition Conditions and Characterization of the SiOC Layer, in Particular its Roughness:

The primer layer according to the invention satisfies the formula $SiO_xC_y$ (also being denoted for convenience in the present description by the formula SiOC, without prejudicing the actual oxygen and carbon contents). The primer layer therefore advantageously comprises Si, O, C and optionally a minor amount of nitrogen. It may also comprise elements in a minor amount relative to silicon, for example metals such as Al, Zn or Zr. This coating may in particular be deposited by pyrolysis, especially by gas-phase pyrolysis (i.e. CVD). The latter technique enables thin SiOC films to be quite easily obtained, especially either by deposition directly on the float glass ribbon or subsequently in the case of glass substrates. The silicon precursor used may take the form of a silane of $SiH_4$ type or an organosilane of the $RSiX_3$ type, where X is a halide of the chlorine type and R is an alkyl (whether linear or branched). It may be an organosilane of the $R_ySiX_{4-y}$ type, with the same conventions as regards R and X, or a compound belonging to the family of ethoxy silanes. Other gases/precursors may be added to the silicon precursor(s), such as ethylene and an oxidizing agent ($O_2$, $H_2O$, $H_2O_2$, $CO_2$, etc.).

The SiOC primer layer according to the invention preferably has a thickness of at least 10 nm, especially between 10 and 200 nm, for example between 30 and 120 nm.

According to the invention, the deposition, especially CVD, conditions are adjusted so that the SiOC primer layer has a certain roughness. In particular, said roughness may take the form of irregularities on the surface of the primer layer, for example nanoscale protuberances and/or hollows, especially in the form of bumps.

More particularly, they may be at least partly noncontiguous irregularities: the external face of the SiOC primer layer advantageously has according to the invention a relatively smooth profile from which the protuberances, especially in the form of bumps, emerge, which may overlap or be contiguous, but at least some of which are separate. According to the invention, such surface structuring can be achieved by in particular varying the SiOC layer deposition parameters during the pyrolysis CVD process and especially by varying the oxidizing gas/$SiH_4$ and ethylene/$SiH_4$ ratios. According to the invention, the oxidizing gas/$SiH_4$ ratio preferably between about 3 and about 70 and the ethylene/$SiH_4$ ratio is between about 0.9 and about 6.

According to the present invention, these irregularities vary in size, for example with a diameter distribution of between 5 and 300 nm, especially between 50 and 100 nm. The term "diameter" is understood here in the broad sense, likening these irregularities to solid hemispheres (protuberances) or empty hemispheres (hollows). It goes without saying that this is an average size, which includes protuberances/hollows of more random shape, for example more elongate shape. These irregularities may also have a height (in the case of protuberances) or a depth (in the case of hollows) of between 5 and 100 nm, especially between 40 and 60 nm or even between 10 and 50 nm. These indicate the maximum valve for the size of each protuberance/hollow to be evaluated. One way of measuring these dimensions may consist for example of measurements based on SEM (scanning electron microscopy) photographs by revealing the distribution of these irregularities per unit area of the substrate. Thus, this first coating may have at least ten protuberances/hollows per $\mu m^2$ of coated substrate, especially at least 20 per $\mu m^2$ of coated substrate.

Typically, the RMS roughness, expressed in nm, of the surface irregularities is greater than 4 nm. Preferably, this roughness is less than 30 nm, or less than 25 or even less than 20 nm. Preferably, this roughness is greater than 5 nm, or even greater than 6 nm. In particular, this first layer may have an RMS roughness of between 4 and 15 nm.

2) Activating Plasma Conditions:

According to the invention, the primer layer is treated by an activated gas in the form of a plasma. This step may be carried out in various vacuum or atmospheric-pressure chambers. For example, it is possible to use a parallel-plate RF reactor. The treatment results in a chemical modification of the layer, but the morphology of the layer suffers little or no alteration. The gas used is chosen from $N_2$, $O_2$ or $H_2O$ or a mixture of these gases, in particular an $N_2/H_2O$ mixture obtained by bubbling a stream of nitrogen through a bubbler containing deionized water at room temperature. The $N_2/H_2O$ mixture used contains up to 3% water by volume, the working pressure is regulated between 75 and 300 mtorr, the power between 150 and 5000 W, and the activation time is preferably between about 1 minute and about 15 minutes, typically between 5 and 10 minutes.

3) Hydrophobic Layer Deposition Conditions:

According to the invention, the hydrophobic layer comprising a fluoroalkylsilane may be deposited by any technique known at the present time, without the choice of deposition technique being considered as preferred technique in the context of the present invention.

In particular, the hydrophobic layer may be deposited, without being restricted thereto, by wipe-on techniques well known in the field or else by atmospheric or vacuum plasma deposition techniques, as described in the abovementioned documents.

The invention also relates to a glass, ceramic or glass-ceramic substrate provided with a hydrophobic coating that can be obtained by implementing a process according to one of the above embodiments, comprising:

an $SiO_xC_y$, i.e. essentially, or exclusively, consisting of silicon oxycarbide, primer layer, the surface of which has an RMS surface roughness of greater than 4 nm and has been activated by treatment with a plasma of a gas chosen from the noble gases, of the Ar or He type, and the gases $N_2$, $O_2$ or $H_2O$, or by a plasma of a mixture of at least two of these gases, preferably under conditions not modifying or substantially not modifying the surface roughness; and a hydrophobic coating layer on said primer layer, comprising a fluorocompound, preferably a fluoroalkylsilane, especially a hydrophobic perfluoro-terminated alkylsilane.

Preferably, the substrate is obtained by carrying out an activation step in which said $SiO_xC_y$ primer layer is activated by means of a plasma of a gas mixture containing $H_2O$ and at least one gas chosen from Ar, He or $N_2$, the volume percentage of $H_2O$ in the mixture preferably being less than 3%.

For example, the thickness of the $SiO_xC_y$ primer layer is between 10 and 200 nm.

Typically, the RMS roughness of the $SiO_xC_y$ primer layer is less than 30 nm, or less than 25 or even 20 nm. Preferably, this roughness is greater than 5 nm or even greater than 6 nm. Typically, it is between 4 and 15 nm, especially between 6 and 15 nm. In general, the RMS roughness of the $SiO_xC_y$ primer layer is formed by irregularities on the surface of the primer layer, for example protuberances and/or hollows, especially in the form of bumps, the height of which is between 5 and 100 nm and the number of which is at least 10 per $\mu m^2$ of coated substrate.

In the glass substrate according to the invention, said perfluoro-terminated alkylsilane may comprise a group of the type represented by the general formula:

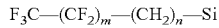

where:
m=0 to 15, preferably 5 to 9; and
n=1 to 5, preferably n=2.

According to an alternative embodiment, said perfluoro-terminated alkylsilane comprises a group of the perfluoropolyether type which may be of the type represented by the general formula:

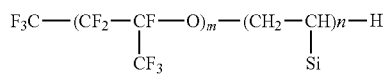

or by the general formula:

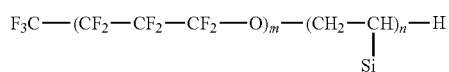

in which:
m=2 to 30; and
n=1 to 3, preferably n=1.

Typically, the thickness of the hydrophobic coating layer on the primer layer is between 1 and 10 nm, preferably between 1 and 5 nm.

The invention also relates to monolithic, laminated or multiple glazing formed by or incorporating the glass substrate described above and to the use of said glass substrate as glazing for transport vehicles or for buildings.

The following should be pointed out:
the term "monolithic glazing" is understood to mean glazing consisting of a single glass sheet;
the term "laminated glazing" is understood to mean a stack of several sheets joined together, for example glass or plastic sheets fixed together by means of adhesive layers made of polyvinyl butyral, polyurethane, etc.; and
the term "multiple glazing" is understood to mean an assembly of separate sheets, i.e. in particular separated from each other by air layers.

The following applications in the case of a hydrophobic substrate according to the invention may especially be mentioned, without the list below being exhausted:
as glazing for transport vehicles (automobile side window, aviation or automobile windshield) or for buildings;
as glass-ceramic hob or oven door;
as municipal furniture element, especially as bus shelter element; and
as furniture element, especially as a mirror, storage shelf, shelf for a domestic electrical appliance, such as a refrigerator, a shower cabinet element or partition; and
as screen, especially a television screen, touch-sensitive screen, plasma screen.

The following examples serve to illustrate the invention, without however limiting the scope thereof, according to any of the aspects described. In these examples, unless otherwise indicated, all the percentages are given by weight.

EXAMPLES

As reported in the following examples, various specimens, some in accordance with the invention and others given purely by way of comparison, were prepared in order to characterize the technical effect and the advantages afforded by implementing the present invention.

In all the examples, the same experimental protocol described below was respected (except for those indicated by asterisks in Tables 1 and 2 below):

a) Preparation of a Glass Substrate Provided with an SiOC Primer Layer:

A silicon oxycarbide (SiOC) primer layer was firstly deposited by thermal CVD on a glass substrate with a thickness of 4 mm, sold by Saint-Gobain Glass France under the reference SGG Planilux.

The silicon oxycarbide was deposited by CVD on a first series of specimens using precursors in the form of a mixture of $SiH_4$, ethylene and $CO_2$ diluted in a nitrogen carrier gas in the following respective proportions in vol %: 0.41/2.74/6.85/90.1, with the aid of a nozzle placed above and transversely to the glass, the glass being heated beforehand to a temperature of about 600° C.

The SiOC layer obtained had a thickness of about 60 nm and a morphology, revealed by SEM analysis, comprising solid hemispheres in the form of bumps. These protuberances had a maximum height of about 40 nm with a surface concentration of 180 per µm². The RMS roughness characterized by AFM (atomic force microscopy) of this SiOC layer was about 9 nm.

An SiO₂ sublayer was deposited on a second series of specimens, either by the same CVD technique or by a magnetron deposition technique, according to the experimental protocol described in Example 2-IV of patent application WO 2005/084943, or else by sol-gel deposition in accordance with the teaching of patent EP 799 873 B1.

Some of the sublayers obtained after step a) were then activated by various plasmas under vacuum and at room temperature in a PECVD reactor (cf. Table 1 below).

b) Plasma Activation:

Some of the substrates prepared in step a), which were provided with silicon oxycarbide layers (first series of specimens) or with silica layers (second series of specimens) were then activated by various plasmas.

To do this, the substrate provided with its primer layer was placed in a chamber of a low-pressure PECVD (plasma-enhanced chemical vapor deposition) reactor. A residual vacuum in the chamber of at least 5 mPa (5·10⁻⁵ mbar) was firstly created prior to the activating gas being introduced. The gas or gas mixture used for the surface treatment of the silicon oxycarbide or silica was introduced into the chamber with flow rates varying between 20 sccm and 200 sccm until the total pressure in the reactor was set between 9.99 and 26.66 Pa (75-200 mTorr).

At equilibrium, a plasma of the gas introduced was ignited by electrically biasing the gas diffuser with an average radiofrequency (13.56 MHz) power of 200 W for a time ranging from 1 to 5 minutes at room temperature.

c) Fluorosilane Application:

After step b) (or after step a) in the absence of activation), a perfluorodecyltriethoxysilane solution was in turn deposited on the primer-coated substrate by wiping it with a cloth. In the examples, the various layers were deposited by this well-known technique, in which the material or its precursor is deposited by means of a cloth soaked therewith. Of course, it would however not be outside the scope of the invention if the deposition were to be carried out by any other technique known for this purpose in the field, in particular by spraying, which moreover allows better control of the layer thickness, by spin coating, by dip coating or even by flow coating.

More precisely, the specimens were wiped with a composition produced 2 hours before their application, in the following manner (the percentages are by weight): a mixture of 90% 2-propanol and 10% 0.3N HCl in water was obtained. A 2% proportion, relative to the aforementioned two constituents, of the compound with the formula $C_8F_{17}(CH_2)_2Si(OEt)_3$, where E=ethyl, was added. After standing for 15 minutes at room temperature, the excess fluorosilane was removed by cleaning with isopropanol. The thickness of the layer obtained was about 4 nm.

All the examples produced, together with the various experimental conditions specific to each of the examples produced, are given in Table 1 below:

TABLE 1

| Specimen | Sublayer (primer) | Primer deposition technique | Gas used for plasma activation of the primer | Plasma conditions | Hydrophobic layer deposition technique |
|---|---|---|---|---|---|
| E1 | SiOC | CVD | No activation | — | Wipe-on |
| E2 | SiOC | CVD | $N_2 + H_2O$*** | PECVD | Wipe-on |
| E3 | SiOC | CVD | $N_2$ | PECVD | Wipe-on |
| E4 | SiOC | CVD | $O_2$ | PECVD | Wipe-on |
| E5 | SiOC | CVD | $SF_6$** | PECVD** | Wipe-on |
| E6 | SiO₂ | Magnetron | No activation | — | Wipe-on |
| E7* | SiO₂ | Sol-gel* | No activation | — | Wipe-on |
| E8 | SiO₂ | Magnetron | $N_2 + H_2O$*** | PECVD | Wipe-on |
| E9 | SiO₂ | Magnetron | $N_2$(or $O_2$) | PECVD | Wipe-on |
| E10** | SiO₂ | Magnetron** | $SF_6$** | PECVD** | Wipe-on |

*According to Example 5b of EP 799 873;
**According to Example 2-IV of WO 2005/084943;
***N₂/H₂O gas mixture containing 3% water.

Specimens E2, E3 and E4 described in Table 1 were in accordance with the invention. AFM analysis of the roughness of the SiOC sublayer showed that the morphology of the primer layer surface was unaffected by the activation treatment using the N₂/H₂O, N₂ or O₂ plasma, the measured, remaining RMS roughness being about 9 nm for all three specimens. Specimens E1 and E5 to E10 are given for comparison:

the primer layer deposited on specimen E1 was not plasma-activated;

the primer layer deposited on specimen E5 was activated by a fluorine-containing plasma according to the teaching of patent application WO 2005/084943;

specimens E6 to E10, not in accordance with the invention, illustrate conventional configurations of obtaining current silica-based primer layers.

The specimens prepared as described above were evaluated according to the following criteria:

1) the initial water contact angle measurement, which provides a reference indication of the hydrophobicity of the grafted substrate;
2) the abrasion resistance, obtained by measuring the residual contact angle of water on the specimen after the grafted hydrophobic coating was abraded according to two different tests:
   a) the Opel® rubbing test carried out on the specimens with a felt disk of H1 hardness under a load of 0.4 kg/cm² on an area measuring 1.5 cm², with a translational rate of 50 cycles/minute and a rotation speed of 6 rpm. A specimen is deemed to be satisfactory in the test if the contact angle remains greater than 80° after 15000 cycles;
   b) the Toyota® rubbing test, carried out according to the TSR7503G standard, with a load of 0.3 kg/cm² on an area measuring 4 cm² with a translational rate of 40 cycles/minute and using a device manufactured by the company Daiei Kagaku Seiki. A specimen is deemed to be satisfactory in the test if the contact angle remains greater than 80° after 9000 cycles; and
3) the UV-A radiation resistance, measured in tests in which the specimens are continuously illuminated with a xenon lamp emitting UV radiation, the illumination intensity of which, integrated between 300 nm and 400 nm, is 60 W/m². A specimen is deemed to be satisfactory in the test if the contact angle remains greater than 80° after 2000 hours of exposure.

The results obtained for the specimens prepared in accordance with specimens E1 to E10 are given in Table 2.

TABLE 2

| Specimen | Primer/activating plasma | Initial contact angle | Contact angle after the Opel test (number of cycles) | Contact angle after the Toyota test (number of cycles) | Contact angle after the UV-A (2000 hour) test |
|---|---|---|---|---|---|
| E1 | SiOC/— | 113° | 78° (5000) | 82° (9000) | >85° |
| E2 | SiOC/ N$_2$ + H$_2$O*** | 116° | 96° (15000) | 106° (9000) | >85° |
| E3 | SiOC/N$_2$ | 115° | 98° (15000) | 106° (9000) | >85° |
| E4 | SiOC/O$_2$ | 114° | 98° (15000) | 100° (9000) | >85° |
| E5 | SiOC/SF$_6$ | 112° | 86° (15000) | 83° (9000) | >85° |
| E6 | SiO$_2$/— | 118° | — | 62° (1500) | >85° |
| E7 | SiO$_2$/— | 105° | 80° (15000) | 80° (1500) | >85° |
| E8 | SiO$_2$/ N$_2$ + H$_2$O*** | 113° | — | 69° (3000) | >85° |
| E9 | SiO$_2$/N$_2$(O$_2$) | 112° | — | 70° (3000) | >85° |
| E10** | SiO$_2$/SF$_6$ | 110° | 90° (15000) | 95° (9000) | >85° |

*According to Example 5b of EP 799 873;
**According to Example 2-IV of WO 2005/084943;
***N$_2$/H$_2$O gas mixture containing 3% water.

Comparison of the data given in Table 2 shows that the presence of an SiOC primer sublayer activated by an N$_2$+H$_2$O, N$_2$ or O$_2$ plasma according to the invention results in the treated surface having initial rain-resistant properties substantially in accordance with those obtained with the best primers of the prior art.

The UV resistance properties of the hydrophobic substrates according to the invention are in accordance with the current standards.

Comparison of the data collated in Table 2 also shows that the resistance properties of specimens E2 to E4, in accordance with the invention, have an abrasion resistance never yet observed hitherto. Thus, the results obtained for specimens E2 to E4 are significantly better than those of all the comparative examples, whether in the case of the Opel® test or the Toyota® test.

The aim of an additional step was to measure the hydrolytical resistance properties of the substrates provided with the hydrophobic coating according to the invention.

The hydrolytical resistance properties of the hydrophobic substrates according to the invention were measured conventionally by the salt corrosion resistance test, often referred to in the field as the NSF (neutral salt fog) test as described in the NF ISO 9227 standard. The test consists in spraying fine droplets of salt water (50 g/l NaCl solution of 7 pH) at a temperature of 35° C. onto the specimens to be measured. The specimens are inclined at 20° to the vertical. The most stringent standard currently in force as regards application on automobile side windows requires a water contact angle of greater than 70° after 300 hours of the test.

Specimen E3, comprising a hydrophobic coating according to the invention (N$_2$ plasma activation), shows a salt corrosion resistance, measured by the NSF test, which is completely satisfactory in the desired application. The contact angle measured after 824 hours of the NSF test was still 94°, and the same applies to example E4.

Specimen E2, comprising the hydrophobic coating according to the invention, the silicon oxycarbide sublayer of which was this time activated by a plasma of a mixture of N$_2$ and H$_2$O gases, shows a salt corrosion resistance, measured by the NSF test, which is particularly high. The contact angle measured after 824 hours of the NSF test was thus even greater than 100°, this being quite remarkable.

The properties of the coatings obtained were also evaluated according to the RMS roughness of the SiOC sublayer.

In particular, during CVD deposition of silicon oxycarbide SiOC on the glass substrate, the volume percentages in the initial mixture of the various precursors, SiH$_4$, ethylene, CO$_2$ and nitrogen carrier gas, were varied in the following proportions, in vol % in the mixture: 0.1-1% SiH$_4$; 0.5-4.0% ethylene; 2-30% CO$_2$; 70-95% N$_2$.

Different SiOC layers were thus produced on the substrate, these having an RMS roughness varying between 0.4 nm and 15.8 nm. The layers thus obtained were then all activated using the same protocol as that used for obtaining specimen E2, in particular by a plasma comprising a mixture of N$_2$ and H$_2$O gases with 3% water under the conditions described above in step b). The fluorosilane was then applied to the various substrates in accordance with the protocol described in step c).

The abrasion resistance of the hydrophobic substrates thus obtained was measured by the Opel test (15000 cycles). The results are given in Table 3 below:

TABLE 3

| Specimen | Primer | RMS roughness (nm) | Activating plasma | Initial contact angle | Contact angle after the Opel test (15000 cycles) |
|---|---|---|---|---|---|
| E2 | SiOC | 7 | N$_2$ + H$_2$O*** | 116° | 96° |
| E11 | SiOC | 0.4 | N$_2$ + H$_2$O*** | 112° | 38° |
| E12 | SiOC | 2.3 | N$_2$ + H$_2$O*** | 114° | 46° |
| E13 | SiOC | 12.8 | N$_2$ + H$_2$O*** | 115° | 100° |
| E14 | SiOC | 9.1 | N$_2$ + H$_2$O*** | 116° | 97° |
| E15 | SiOC | 6.3 | N$_2$ + H$_2$O*** | 110° | 96° |
| E16 | SiOC | 4.1 | N$_2$ + H$_2$O*** | 115° | 67° |
| E17 | SiOC | 15.8 | N$_2$ + H$_2$O*** | 115° | 88° |

***N$_2$/H$_2$O gas mixture containing 3% water.

It may be seen, by comparison of the data collated in Table 3, that the abrasion resistance properties of specimens E11 and E12, the RMS roughness of which is too low in the context of the present invention, are insufficient. Specimens E2 and E13 to E15, the RMS roughness's of which are between 6 and 15 nm, have better abrasion resistance properties.

The above examples show that extremely significant improvements in the abrasion resistance properties of hydrophobic substrates may be obtained according to the invention by the choice of the following characteristics:
 the nature of the sublayer (SiOC);
 its roughness;
 the application of an activating plasma treatment on said sublayer; and
 the nature of said plasma treatment.

The invention claimed is:
1. A substrate, comprising:
 a) a silicon oxycarbide, SiO$_x$C$_y$, primer layer having an RMS roughness of greater than 4 nm; and b) a hydrophobic coating on the primer layer, wherein the hydrophobic coating comprises a fluorocompound wherein at least one condition selected from the group consisting of (i) and (ii) is satisfied:
   (i) the RMS roughness of the primer layer is formed by at least one irregularity on a surface of the primer layer, wherein a height of the at least one irregularity is between 5 and 100 nm and the number of the at least one irregularity is at least 10 per $\mu m^2$ of coated substrate; and
   (ii) the fluorocompound is a perfluoro-terminated alkylsilane comprising a perfluoropolyether group.

2. A process for producing the substrate of claim 1, the process comprising:
   a) applying a silicon oxycarbide, $SiO_xC_y$, primer layer on a substrate, wherein the primer layer has an RMS surface roughness of greater than 4 nm;
   b) activating the primer layer on the substrate with a plasma of at least one gas selected from the group consisting of Ar, He, $N_2$, $O_2$, and $H_2O$; and then
   c) depositing the hydrophobic coating comprising at least one fluorocompound on the primer layer.

3. The process of claim 2, wherein the activating b) is carried out with the plasma comprising $H_2O$ and at least one gas selected from the group consisting of Ar, He, and $N_2$.

4. The process claim 2, wherein the primer layer is deposited by thermal CVD under conditions producing an RMS surface roughness of between 4 and 15 nm.

5. The process of claim 2, wherein the depositing c) is carried out with a solution comprising a perfluoroalkylsilane of formula (I):

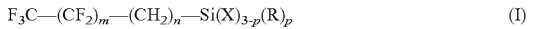

wherein:
   m=0 to 15;
   n=1 to 5;
   p=0, 1, or 2;
   R is an alkyl group or a hydrogen atom; and
   X is a hydrolyzable group.

6. The process of claim 2, wherein the depositing c) is carried out with a solution comprising a perfluoropolyether-silane perfluoroalkylsilane.

7. The substrate of claim 1, wherein a thickness of the primer layer is between 10 and 200 nm.

8. The substrate of claim 1, wherein the RMS roughness of the primer layer is between 4 and 15 nm.

9. The substrate of claim 1, wherein the RMS roughness of the primer layer is formed by at least one irregularity on a surface of the primer layer, wherein a height of the at least one irregularity is between 5 and 100 nm and the a number of the at least one irregularity is at least 10 per $\mu m^2$ of coated substrate.

10. The substrate of claim 1, wherein the fluorocompound is a perfluoro-terminated alkylsilane comprising a group of formula (II):

wherein:
   m=0 to 15; and
   n=1 to 5.

11. The substrate of claim 1, wherein the fluorocompound is a perfluoro-terminated alkylsilane comprising a perfluoropolyether group.

12. The substrate of claim 11, wherein the alkylsilane comprises a group of formula (III):

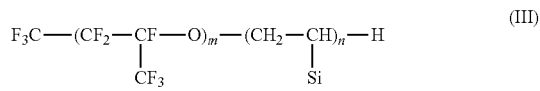

or formula (IV):

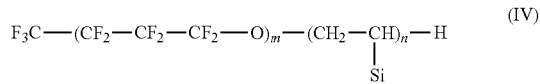

wherein:
   m=2 to 30; and
   n=1 to 3.

13. The substrate of claim 1, wherein a thickness of the hydrophobic coating layer is between 1 and 10 nm.

14. A monolithic, laminated, or multiple glazing, comprising the substrate of claim 1.

15. Transport vehicles or buildings comprising the glazing of claim 14.

16. The process of claim 2, wherein the substrate is selected from the group consisting of glass, a ceramic, and a glass-ceramic.

17. The process of claim 2, wherein the activating b) occurs under conditions that do not modify, or substantially so, the RMS surface roughness of the primer layer.

18. The process of claim 2, wherein the at least one fluorocompound comprises a fluoroalkylsilane.

19. The process of claim 3, wherein the volume percentage of $H_2O$ in the plasma is less than or equal to about 3%.

20. The process of claim 4, wherein the primer layer is deposited by thermal CVD under conditions producing an RMS surface roughness of between 6 and 15 nm.

* * * * *